United States Patent
Shin et al.

(10) Patent No.: US 11,113,211 B2
(45) Date of Patent: *Sep. 7, 2021

(54) MEMORY DEVICE SUPPORTING RANK-LEVEL PARALLELISM AND MEMORY SYSTEM INCLUDING THE SAME

(71) Applicants: SK hynix Inc., Icheon (KR); Korea Advanced Institute of Science and Technology, Daejeon (KR)

(72) Inventors: Wongyu Shin, Seoul (KR); Leesup Kim, Daejeon (KR); Youngsuk Moon, Yongin (KR); Yongkee Kwon, Seoul (KR); Jaemin Jang, Seoul (KR)

(73) Assignees: SK hynix Inc., Icheon (KR); Korea Advanced Institute of Science and Technology, Daejeon (KR)

( * ) Notice: Subject to any disclaimer, the term of this patent is extended or adjusted under 35 U.S.C. 154(b) by 105 days.

This patent is subject to a terminal disclaimer.

(21) Appl. No.: 16/574,425

(22) Filed: Sep. 18, 2019

(65) Prior Publication Data

US 2020/0012607 A1  Jan. 9, 2020

Related U.S. Application Data

(62) Division of application No. 15/628,960, filed on Jun. 21, 2017, now Pat. No. 10,459,853.

(30) Foreign Application Priority Data

Nov. 1, 2016 (KR) .......................... 10-2016-0144151

(51) Int. Cl.
*G06F 13/16* (2006.01)
*G06F 12/02* (2006.01)
(Continued)

(52) U.S. Cl.
CPC ........ *G06F 13/1647* (2013.01); *G06F 3/0659* (2013.01); *G06F 12/0284* (2013.01);
(Continued)

(58) Field of Classification Search
CPC ............. G06F 13/1647; G06F 12/0284; G06F 3/0659; G06F 13/36; G06F 12/0607; G06F 2212/1024; Y02D 10/00
See application file for complete search history.

(56) References Cited

U.S. PATENT DOCUMENTS 7,061,784 B2  6/2006  Jakobs et al.
7,694,093 B2 * 4/2010  Shaw .................. G06F 11/1666
                                                        711/162
(Continued)

FOREIGN PATENT DOCUMENTS

KR  1020060133036 A  12/2006

OTHER PUBLICATIONS

Hsing, Yu-Tsao, et al. "SDRAM delay fault modeling and performance testing." 25th IEEE VLSI Test Symposium (VTS'07). IEEE, 2007. (Year: 2007).*

(Continued)

*Primary Examiner* — Francisco A Grullon

(57) ABSTRACT

A memory system may include: a memory controller; a plurality of ranks; and a rank shared bus configured to couple the memory controller and the plurality of ranks. Each of the plurality of ranks may include: a plurality of banks; a rank bus coupled to the plurality of banks and configured to selectively transmit data to the rank shared bus or an intermediate buffer and selectively receive data from the rank shared bus or the intermediate buffer; and an intermediate buffer configured to be selectively coupled to the rank bus or the rank shared bus, according to a first signal from the memory controller.

3 Claims, 12 Drawing Sheets

(51) Int. Cl.
*G06F 3/06* (2006.01)
*G06F 13/36* (2006.01)
*G06F 12/06* (2006.01)

(52) U.S. Cl.
CPC .......... *G06F 13/36* (2013.01); *G06F 12/0607* (2013.01); *G06F 2212/1024* (2013.01); *Y02D 10/00* (2018.01)

(56) References Cited

U.S. PATENT DOCUMENTS

| | | | | |
|---|---|---|---|---|
| 7,711,887 | B1* | 5/2010 | Warnes | G06F 13/1694 710/315 |
| 2008/0082763 | A1* | 4/2008 | Rajan | G11C 11/4093 711/154 |
| 2014/0192583 | A1* | 7/2014 | Rajan | G11C 5/06 365/63 |
| 2015/0106560 | A1* | 4/2015 | Perego | G06F 12/0246 711/105 |
| 2017/0262367 | A1* | 9/2017 | Chun | G06F 12/0802 |

OTHER PUBLICATIONS

"DDR3 SDRAM Standard", JEDEC Standard, Jul. 2012, pp. 1-226, JESD79-3F, JEDEC Solid State Technology Association, Arlington VA, US.

"3rd JILP Workshop on Computer Architecture Competitions (JWAC-3): Memory Scheduling Championship (MSC)", The Journal of Instruction-Level Parallelism, Jun. 9, 2012, http://www.cs.utah.edu/rajeev/jwac12/.

Ishwar Bhati et al., "DRAM Refresh Mechanisms, Penalties, and Trade-Offs", IEEE Transactions on Computers, Jan. 2016, pp. 108-121, vol. 65, No. 1, IEEE.

Ishwar Bhati et al., "Flexible Auto-Refresh: Enabling Scalable and Energy-Efficient DRAM Refresh Reductions", ISCA 15, Jun. 13-17, 2015, pp. 235-246, ACM.

Niladrish Chatterjee et al., "Staged Reads : Mitigating the Impact of DRAM Writes on DRAM Reads", IEEE International Symposium on High Performance Computer Architecture, 2012, IEEE.

Jungwhan Choi et al., "Multiple Clone Row DRAM: A Low Latency and Area Optimized DRAM", ISCA '15, Jun. 13-17, 2015, pp. 223-234, ACM.

Kun Fang et al., "Mini-Rank: A Power-Efficient DDRx DRAM Memory Architecture", IEEE Transactions on Computers, Jun. 2014, pp. 1500-1512, vol. 63, No. 6, IEEE.

Brinda Ganesh et al., "Fully-Buffered DIMM Memory Architectures: Understanding Mechanisms, Overheads and Scaling", IEEE International Symposium on High Performance Computer Architecture, 2007, pp. 109-120, IEEE.

Mrinmoy Ghosh et al., "Smart Refresh: An Enhanced Memory Controller Design for Reducing Energy in Conventional and 3D Die-Stacked DRAMs", 40th IEEE/ACM International Symposium on Microarchitecture, 2007, pp. 134-145, IEEE.

Sung I. Hong et al., "Access Order and Effective Bandwidth for Streams on a Direct Rambus Memory", IEEE International Symposium on High Performance Computer Architecture, 1999.

"2nd Generation Intel Core Processor Family Desktop, Intel Pentium Processor Family Desktop, and Intel Celeron Processor Family Desktop", Apr. 2016, pp. 1-68, Revision 037, Intel Corporation.

Bruce Jacob et al., "Memory Systems: Cache, DRAM, Disk", 2008, pp. 1-982, Elsevier Inc., US.

Myeongjae Jeon et al., "Reducing DRAM Row Activations with Eager Read/Write Clustering", ACM Transactions on Architecture and Code Optimization, Dec. 2013, pp. 1-25, vol. 10, No. 4, Article 43, ACM.

Dimitris Kaseridis et al., "Minimalist Open-page: A DRAM Page-mode Scheduling Policy for the Many-core Era", MICRO '11, Dec. 3-7, 2011, pp. 24-35, ACM.

Dae-Hyun Kim et al., "Architectural Support for Mitigating Row Hammering in DRAM Memories", IEEE Computer Architecture Letters, Jan.-Jun. 2015, pp. 9-12, vol. 14, No. 1, IEEE.

Yoongu Kim et al., "A Case for Exploiting Subarray-Level Parallelism (SALP) in DRAM", IEEE/ACM International Symposium on Computer Architecture, 2012, pp. 368-379, IEEE.

Chang Joo Lee et al., "DRAM-Aware Last-Level Cache Writeback: Reducing Write-Caused Interference in Memory Systems", Electrical and Computer Engineering Commons, Apr. 2010, pp. 1-21, The University of Texas at Austin.

Chang Joo Lee et al., "Improving Memory Bank-Level Parallelism in the Presence of Prefetching", MICRO '09, Dec. 12-16, 2009, pp. 327-336, ACM.

Donghyuk Lee et al., "Adaptive-Latency DRAM: Optimizing DRAM Timing for the Common-Case", IEEE International Symposium on High Performance Computer Architecture, 2015, pp. 489-501, IEEE.

Donghyuk Lee et al., "Tiered-Latency DRAM: A Low Latency and Low Cost DRAM Architecture", IEEE International Symposium on High Performance Computer Architecture, 2013, IEEE.

Donghyuk Lee et al., "Decoupled Direct Memory Access: Isolating CPU and IO Traffic by Leveraging a Dual-Data-Port DRAM", 2015 International Conference on Parallel Architecture and Compilation, 2015, pp. 174-187, IEEE.

Hsien-Hsin S. Lee et al., "Eager Writeback—a Technique for Improving Bandwidth Utilization", IEEE International Conference on Parallel Architecture and Compilation, 2015.

Jamie Liu et al., "RAIDR: Retention_Aware Intelligent DRAM Refresh", International Symposium on Computer Architecture, 2012, pp. 1-12, IEEE.

Lei Liu et al., "A Software Memory Partition Approach for Eliminating Bank-Level Interference in Multicore Systems", PACT '12, Sep. 19-23, 2012, pp. 367-375, ACM.

Gabriel H. Loh, "A Register-file Approach for Row Buffer Caches in Die-stacked DRAMs", MICRO '11, Dec. 3-7, 2011, pp. 351-361, ACM.

Onur Mutlu, "Memory Scaling: A Systems Architecture Perspective", IEEE International Memory Workshop, 2013, IEEE.

Onur Mutlu et al., "Parallelism-Aware Batch Scheduling: Enhancing both Performance and Fairness of Shared DRAM Systems", International Symposium on Computer Architecture, 2008, pp. 63-74, IEEE.

Niladrish Chatterjee et al., "USIMM: the Utah Simulated Memory Module", Feb. 20, 2012, pp. 1-24, University of Utah and Intel Corp.

* cited by examiner

<Prior Art>

FIG. 5

| | Entry 0 | Entry 1 | Entry 2 | Entry 3 |
|---|---|---|---|---|
| Rank 0 | A | O | O | A |
| Rank 1 | A | A | A | O |
| Rank 2 | A | O | A | O |
| Rank 3 | O | O | O | A |

610

A : No Data
O : Data Present

MEMORY DEVICE SUPPORTING RANK-LEVEL PARALLELISM AND MEMORY SYSTEM INCLUDING THE SAME

CROSS-REFERENCE TO RELATED APPLICATION

The present application is a divisional of U.S. application Ser. No. 15/628,960, filed Jun. 21, 2017, which claims priority to Korean Patent Application No. 10-2016-0144151, filed on Nov. 1, 2016, which is incorporated herein by reference in its entirety.

BACKGROUND

1. Field

Embodiments of the present disclosure relate to a memory device and a memory system including the same, and more particularly, to a memory device supporting rank-level parallelism and a memory system including the same.

2. Description of the Related Art

A memory system using a Dynamic Random Access Memory (DRAM) has a hierarchical structure including a plurality of channels. For example, a channel includes a plurality of ranks, and a rank includes a plurality of banks.

FIG. 1 illustrates a conventional memory system 1.

The conventional memory system 1 includes a memory controller 60 and a plurality of ranks 10 to 40 coupled to the memory controller 60.

The memory controller 60 and the plurality of ranks 10 to 40 are coupled to each other through a rank shared bus 50. The rank shared bus 50 may be referred to as a channel.

In FIG. 1, the conventional memory system 1 includes four ranks, that is, a first rank 10, a second rank 20, a third rank 30, and a fourth rank 40.

The first rank 10 includes a first plurality of banks 11 to 18, which are first to eighth banks 11 to 18.

The first plurality of banks 11 to 18 share a first rank bus 19, and the first rank bus 19 is coupled to the rank shared bus 50.

The second rank 20 includes a second plurality of banks 21 to 28, which are first to eighth banks 21 to 28 and share a second rank bus 29, and the second rank bus 29 is coupled to the rank shared bus 50.

The third rank 30 includes a third plurality of banks 31 to 38, which are first to eighth banks 31 to 38 and share a third rank bus 39, and the third rank bus 39 is coupled to the rank shared bus 50.

The fourth rank 40 includes a fourth plurality of banks 41 to 48, which are first to eighth banks 41 to 48 and share a fourth rank bus 49, and the fourth rank bus 49 is coupled to the rank shared bus 50.

In the conventional memory system 1, each of the banks 11 to 18, 21 to 28, 31 to 38, and 41 to 48 includes a row buffer. Based on such a configuration, the conventional memory system 1 supports bank-level parallelism for performing an operation on one of the banks 11 to 18, 21 to 28, 31 to 38, and 41 to 48 while performing an operation on another one of the banks 11 to 18, 21 to 28, 31 to 38, and 41 to 48.

In the conventional memory system 1, however, the first, second, third, and fourth ranks 10, 20, 30, and 40 are coupled to the memory controller 60 in common through the rank shared bus 50.

Thus, when one of the ranks 10, 20, 30, and 40 uses the rank shared bus 50, another one of the ranks 10, 20, 30, and 40 cannot use the rank shared bus 50.

When a row access operation such as an active operation or a precharge operation in a DRAM is performed at a bank level, a row buffer of a corresponding bank is used. Using different row buffers, different banks can perform respective row access operations at the same time. For example, in the conventional memory system 1 shown in FIG. 1, when the first bank 31 of the third rank 30 performs an active operation, the eighth bank 38 of the third rank 30 can perform a precharge operation at the same time.

When a column access operation such as a read operation or a write operation is performed, however, a row buffer and a memory controller transmit and receive data therebetween through a corresponding rank bus and a rank shared bus. Thus, in order to prevent a data collision, the column access operation must be performed only on one rank at a time. For example, in the conventional memory system 1 shown in FIG. 1, when a read operation is performed on the first rank 10, a write operation cannot be performed on the fourth rank 40 at the same time.

Thus, when the plurality of ranks 10, 20, 30, and 40 read column data, the ranks 10, 20, 30, and 40 sequentially read the data. Therefore, the performance of the conventional memory system 1 may be degraded by a time delay.

SUMMARY

Various embodiments are directed to a memory device which includes an intermediate buffer in a rank and exploits rank-level parallelism, and a memory system including the same.

In an embodiment, a memory system may include: a memory controller; a plurality of ranks; and a rank shared bus configured to couple the memory controller and the plurality of ranks. Each of the plurality of ranks may include: a plurality of banks; a rank bus coupled to the plurality of banks and configured to selectively transmit data to the rank shared bus or an intermediate buffer and selectively receive data from the rank shared bus or the intermediate buffer; and the intermediate buffer configured to be selectively coupled to the rank bus or the ranks shared bus according to a first signal output from the memory controller.

In an embodiment, a memory device may include: a cell region; a row control circuit configured to control a row operation of the cell region; a column control circuit configured to control a column operation of the cell region; a command decoder configured to process a command provided from a memory controller and control the row control circuit and the column control circuit; a data transmitter/receiver configured to transmit or receive data; and an intermediate buffer configured to communicate with the column control circuit or the data transmitter/receiver according to a first plurality of control signals from the command decoder.

In an embodiment, a memory system may include one or more of memory modules coupled to a memory controller through a channel. Each of the one or more memory modules may include a plurality of ranks, and each of the plurality of ranks may include a plurality of memory devices. Each of the plurality of memory devices may include: a cell region; a row control circuit configured to control a row operation of the cell region; a column control circuit configured to control a column operation of the cell region; a command decoder configured to process a command provided from the memory controller and to control the row control circuit and the column control circuit; a data transceiver configured to transmit/receive data to/from the channel according to control of the command decoder; and an intermediate buffer configured to communicate with the column control circuit or the data transceiver according to a first plurality of control signals from the command decoder.

BRIEF DESCRIPTION OF THE DRAWINGS

FIG. 5 illustrates an intermediate buffer management table according to an embodiment.

DETAILED DESCRIPTION

Hereafter, various embodiments will be described in detail with reference to the accompanying drawings.

Figure 2:
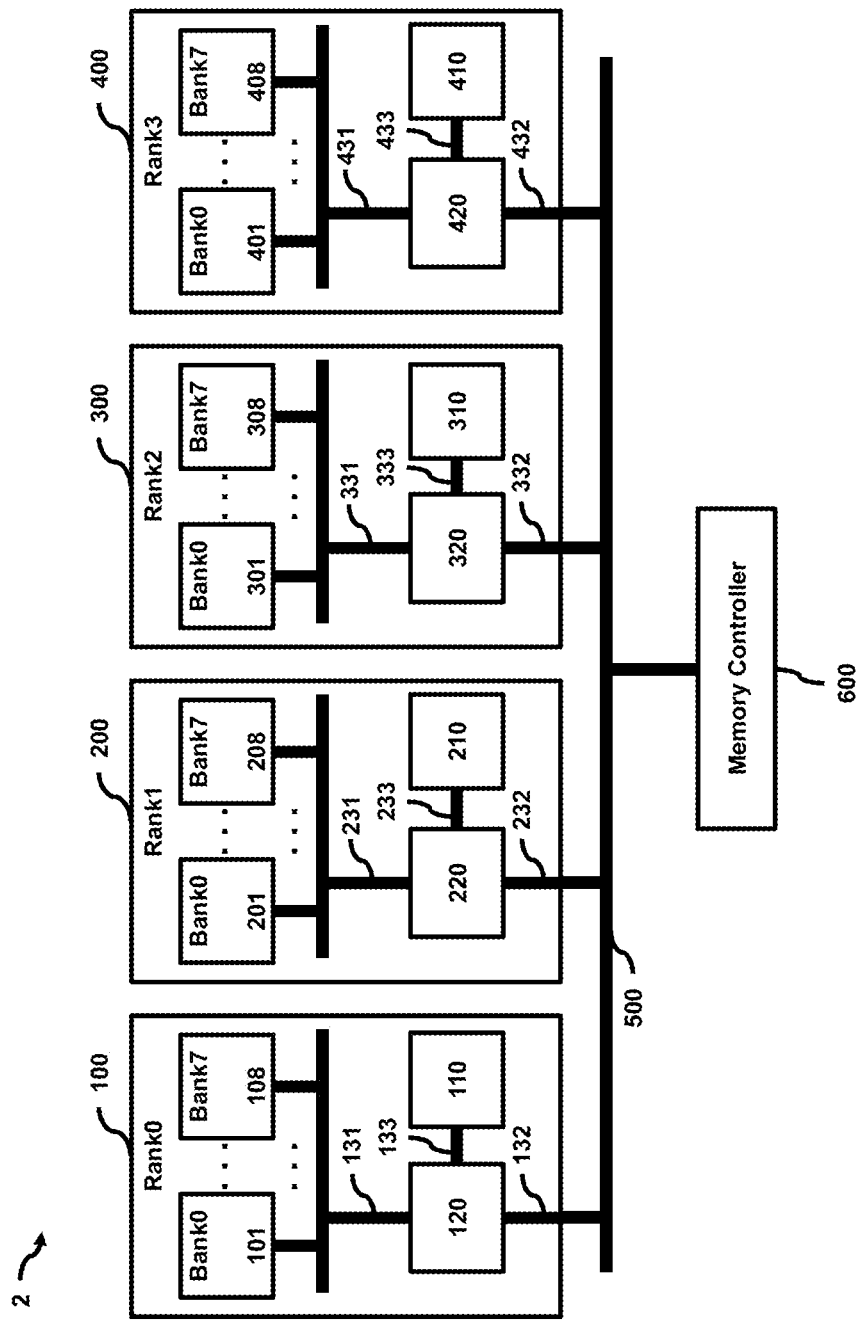
FIG. 2 is a block diagram of a memory system according to an embodiment.

FIG. 2 is a block diagram of a memory system 2 according to an embodiment.

The memory system 2 includes a plurality of ranks 100 to 400 and a memory controller 600 coupled to the plurality of ranks 100 to 400 through a rank shared bus 500.

The rank shared bus 500 may be referred to as a channel.

In FIG. 2, the memory system 2 includes four ranks, that is, a first rank 100, a second rank 200, a third rank 300, and a fourth rank 400. However, the number of ranks included in the memory system 2 is not limited thereto, and the number of ranks may vary according to embodiments.

The first rank 100 includes a plurality of banks 101 to 108, which are first to eighth banks 101 to 108. The plurality of banks 101 to 108 share a first rank bus 131.

The first rank 100 further includes a second rank bus 132 coupled to the rank shared bus 500.

The first rank 100 further includes a first intermediate buffer 110, a first path setting unit (or a first path setting circuit) 120, and a third rank bus 133. The first intermediate buffer 110 and the first path setting unit 120 are coupled to each other through the third rank bus 133.

The path setting unit 120 sets a signal transmission path. For example, the path setting unit 120 may set a first path between the first rank bus 131 and the intermediate buffer 110, set a second path between the second rank bus 132 and the intermediate buffer 110, or set a third path between the first rank bus 131 and the second rank bus 132.

In an embodiment, a path setting operation of the path setting unit 120 may be controlled according to a command provided from the memory controller 600.

The intermediate buffer 110 may transmit signals to the first rank bus 131 and receive signals from the first rank bus 131 through the first path. The intermediate buffer 110 may transmit signals to the second rank bus 132 and receive signals from the second rank bus 132 through the second path.

The second rank 200 includes a plurality of banks 201 to 208, which are first to eighth banks 201 to 208. The plurality of banks 201 to 208 share a first rank bus 231.

The second rank 200 further includes the first rank bus 231, a second rank bus 232, a third rank bus 233, a second intermediate buffer 210, and a second path setting unit 220. Operations of the respective components of the second rank 200 are performed in the same manner as those of the corresponding components of the first rank 100, and thus descriptions of the operations will be omitted for the interest of brevity.

The third rank 300 includes a plurality of banks 301 to 308, a first rank bus 331, a second rank bus 332, a third rank bus 333, a third intermediate buffer 310, and a third path setting unit 320. Operations of the respective components of the third rank 300 are performed in the same manner as those of the corresponding components of the first rank 100, and thus descriptions of the operations will be omitted for the interest of brevity.

The fourth rank 400 includes a plurality of banks 401 to 408, a first rank bus 431, a second rank bus 432, a third rank bus 433, a fourth intermediate buffer 410, and a fourth path setting unit 420. Operations of the respective components of the fourth rank 400 are performed in the same manner as those of the corresponding components of the first rank 100, and thus descriptions of the operations will be omitted for the interest of brevity.

In an embodiment, the memory controller 600 can provide active, precharge, read, and write commands in the same manner as a memory controller of a conventional memory device does.

The memory controller 600 may provide an additional command in order to exploit rank-level parallelism. In an embodiment, such an additional command includes one or more of a rank-level read command, a rank-level write command, a channel-level read command, and a channel-level write command.

For example, the rank-level read command is a command for reading data from one of the banks 101 to 108 and storing the read data in the first intermediate buffer 110, and the rank-level write command is a command for writing data stored in the first intermediate buffer 110 to one of the banks 101 to 108. Hereinafter, the rank-level read command and the rank-level write command may be referred to as rank-level commands.

For example, the channel-level read command is a command for outputting data read from the first intermediate buffer 110 to the rank shared bus 500, and the channel-level write command is a command for storing data transmitted through the rank shared bus 500 in the first intermediate buffer 110. Hereinafter, the channel-level read command and the channel-level write command may be referred to as channel-level commands.

In the memory system 2, while any one of the ranks 100 to 400 uses the rank shared bus 500, another one of the ranks 100 to 400 can perform an operation relating to a rank-level command using a corresponding one of the intermediate buffers 110, 210, 310, and 410.

For example, while a channel-level read operation or a channel-level write operation is performed on any one of the ranks 100 to 400, a rank-level read operation or a rank-level write operation may be performed on another one of the ranks 100 to 400.

Furthermore, while a rank-level read operation or a rank-level write operation is performed in any one of the ranks 100 to 400, a rank-level read operation or a rank-level write operation may be performed in another one of the ranks 100 to 400.

Figure 1:
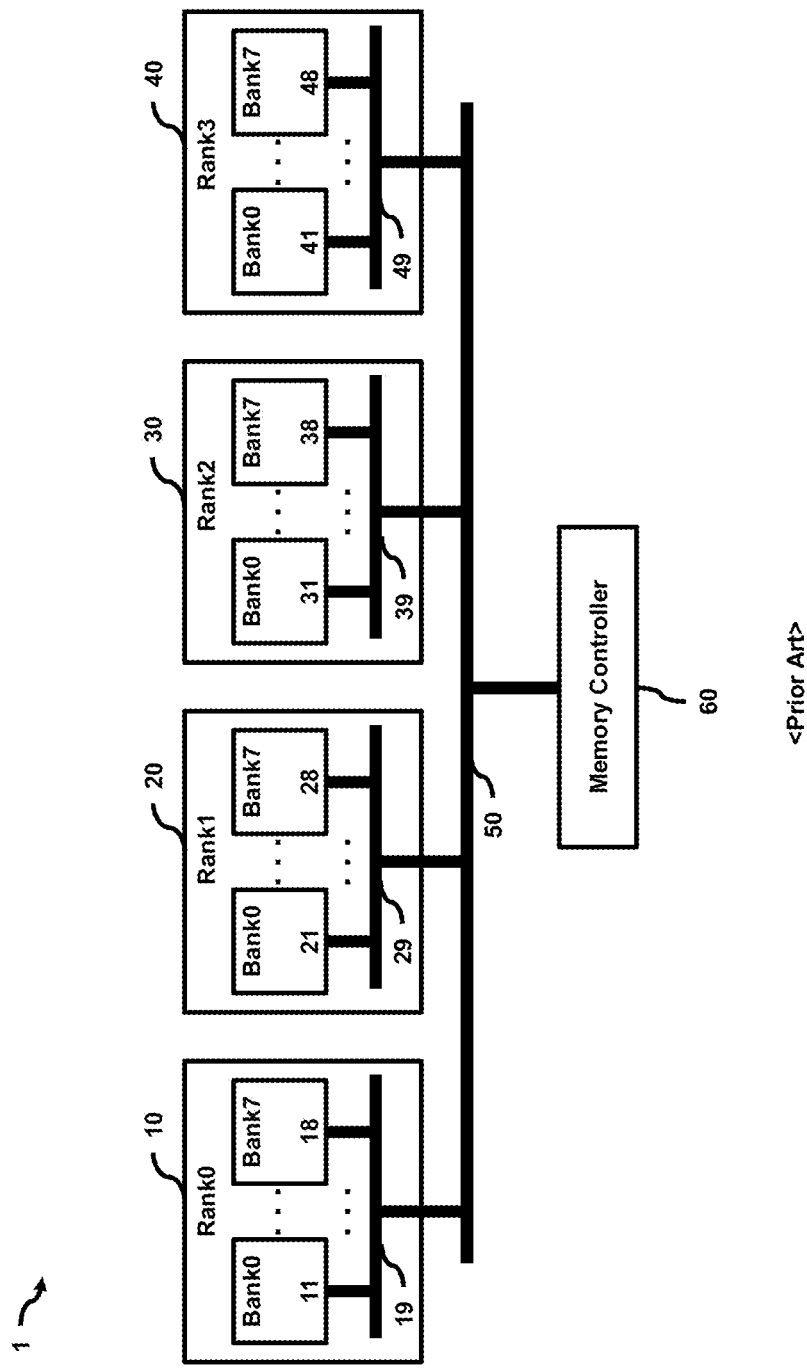
FIG. 1 is a block diagram of a conventional memory system.

In a memory system (e.g., the memory system 2 of FIG. 2) according to an embodiment of the present disclosure, since each rank includes an intermediate buffer, a plurality of read/write operations on respective ranks may be performed partially at the same time. Thus, the performance of the memory system according to the embodiment can be improved while power consumption to perform the read/write operations is reduced, compared to a conventional memory system (e.g., the memory system 1 of FIG. 1), which performs the read/write operations sequentially.

In a conventional memory system, a command address (CA) bus through which a general read command or a general write command is transmitted is used less frequently than a data bus. Therefore, although such a CA bus of the conventional memory system is used in a memory system according to an embodiment in order to transfer the rank-level commands and the channel-level commands, a bus competition is unlikely to occur in the memory system according to the embodiment. Thus, the CA bus of the conventional memory system can be used in the memory system according to the embodiment.

Figure 3:
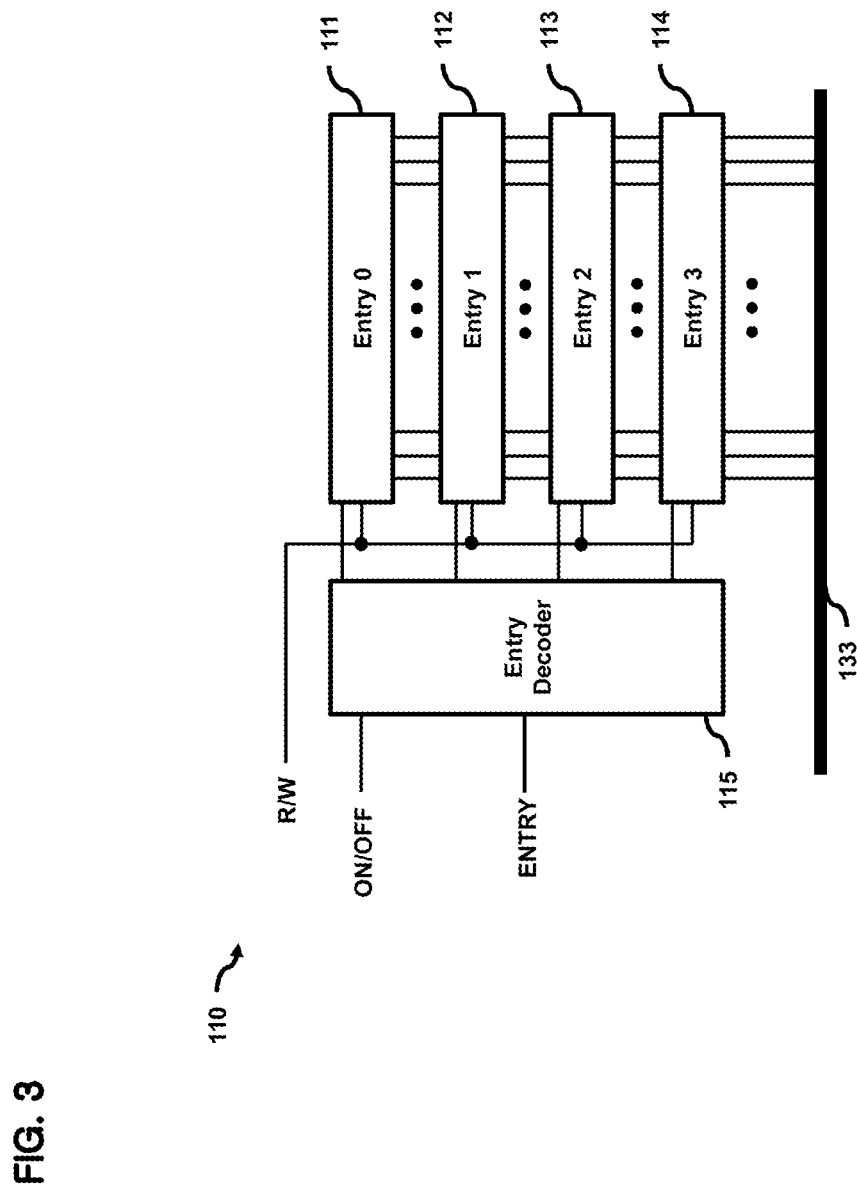
FIG. 3 is a block diagram illustrating an intermediate buffer of FIG. 2, according to an embodiment.

FIG. 3 is a block diagram illustrating the first intermediate buffer 110 of FIG. 2 according to an embodiment.

The first intermediate buffer 110 is used when a rank-level command or a channel-level command is executed, and is not used when a general read command or a general write command is executed. That is, when the general real command or the general write command is executed, the memory system 2 performs a read or write operation without using the first intermediate buffer 110 as the conventional memory system does.

Referring back to FIG. 2, the memory controller 600 may determine whether to provide the general read/write command or whether to provide the channel-level command or the rank-level command, when providing a new column command to at least one of the ranks 100 to 400.

The first path setting unit 120 may set a data path coupling a pair of rank buses among the first to third rank buses 131 to 133, according to a type of a command (e.g., the channel-level command or the rank-level command).

The first intermediate buffer 110 may include two or more entries (or entry circuits), and each of the entries may store read or write data based on a rank-level command (e.g., a rank-level read command) or a channel-level command (e.g., a channel-level write command). In an embodiment, each of the entries is a storage circuit having a size sufficiently large to store the read or write data.

Referring to FIG. 3, the first intermediate buffer 110 includes first to fourth entries 111 to 114 and an entry decoder 115 for selecting any one of the first to fourth entries 111 to 114. However, the number of entries of the first intermediate buffer 110 is not limited thereto, and the number of entries may vary according to embodiments.

When the entry decoder 115 is turned on, the entry decoder 115 couples any one of the first to fourth entries 111 to 114 to the third rank bus 133 according to an entry signal ENTRY. In an embodiment, the entry signal ENTRY has a value indicative of the coupled one of the entries 111 to 114 to the third rank bus 133.

The entry decoder 115 is turned off to isolate all of the entries 111 to 114 from the third rank bus 133. The entry decoder 115 is turned on or off according to an on/off signal ON/OFF.

A value of the on/off signal ON/OFF may be determined depending on whether a general command (e.g., a general read command or a general write command) is executed or whether a rank-level command or a channel-level command is executed. In an embodiment, a command decoder (e.g., a command decoder 1141 of FIG. 8) determines the value of the on/off signal ON/OFF and outputs the on/off signal ON/OFF to the entry decoder 115. In an embodiment, a memory controller (e.g., the memory controller 600 of FIG. 2) provides the entry signal ENTRY.

Any one of the first to fourth entries 111 to 114 stores data transmitted through the third rank bus 133 or outputs data stored therein to the third rank bus 133, according to a read/write signal R/W.

The read/write signal R/W may be controlled according to whether a command is the rank-level command or the channel-level command. In an embodiment, a command decoder (e.g., the command decoder 1141 of FIG. 8) generates the read/write signal R/W according to whether the command is the rank-level command or the channel-level command. For example, when a rank-level read operation or a channel-level write operation is performed, the read/write signal R/W and the entry signal ENTRY control a corresponding one of the entries 111 to 114 to store data transmitted through the third rank bus 133. When a rank-level write operation or a channel-level read operation is performed, the read/write signal R/W and the entry signal ENTRY control a corresponding one of the entries 111 to 114 to output stored data to the third rank bus 133.

When the first intermediate buffer 110 includes the plurality of entries 111 to 114, as illustrated in FIG. 3, the memory controller 600 additionally provides a signal indicative of an entry number while providing the rank-level command.

In general, a row address uses a larger number of address bits than a column address. Thus, when a column operation is performed, some address bits may remain unused. The memory controller 600 may provide a signal indicative of the entry number using such unused bits. The entry signal ENTRY may be the same as the entry number or may be different from the entry number. The entry number may be decoded to the entry signal ENTRY at the command decoder 1141 of FIG. 8.

In an embodiment, the memory controller 600 may output a signal indicative of an entry number when providing a channel-level command. When the channel-level command is executed, the memory controller 600 does not access any bank in a rank. Thus, the memory controller 600 may not provide a bank address and a column address, and the signal indicative of the entry number is distinct from a signal indicative of the bank and column addresses.

The memory controller 600 includes an intermediate buffer management table in order to determine whether entries of an intermediate buffer (e.g., the intermediate buffer 110, 210, 310, or 410 of FIG. 2) included in each rank (e.g., the rank 100, 200, 300, or 400 of FIG. 2) are available.

FIG. 5 illustrates an intermediate buffer management table 610 according to an embodiment.

In the intermediate buffer management table 610, an entry storing meaningful data is indicated by the reference character "O," and an entry storing non-meaningful data is indicated by the reference character "A." For example, the meaningful data corresponds to data that have been read from a bank or that are to be written into the bank, and the non-meaningful data corresponds to data other than the meaningful data. Because a plurality of ranks Rank 0 to Rank 3 respectively include a plurality of intermediate buffers, each of which includes four entry circuits Entry 0 to Entry 3, the intermediate buffer management table 610 includes information on usage statuses of the plurality of intermediate buffers.

For an entry storing meaningful data, the memory controller 600 may provide a command for reading the data stored in the entry. For example, the command includes the rank-level write command or the channel-level read command.

For an entry storing non-meaningful data, the memory controller 600 may provide a command for writing data to the entry. For example, the command includes the rank-level read command or the channel-level write command.

Figure 4:
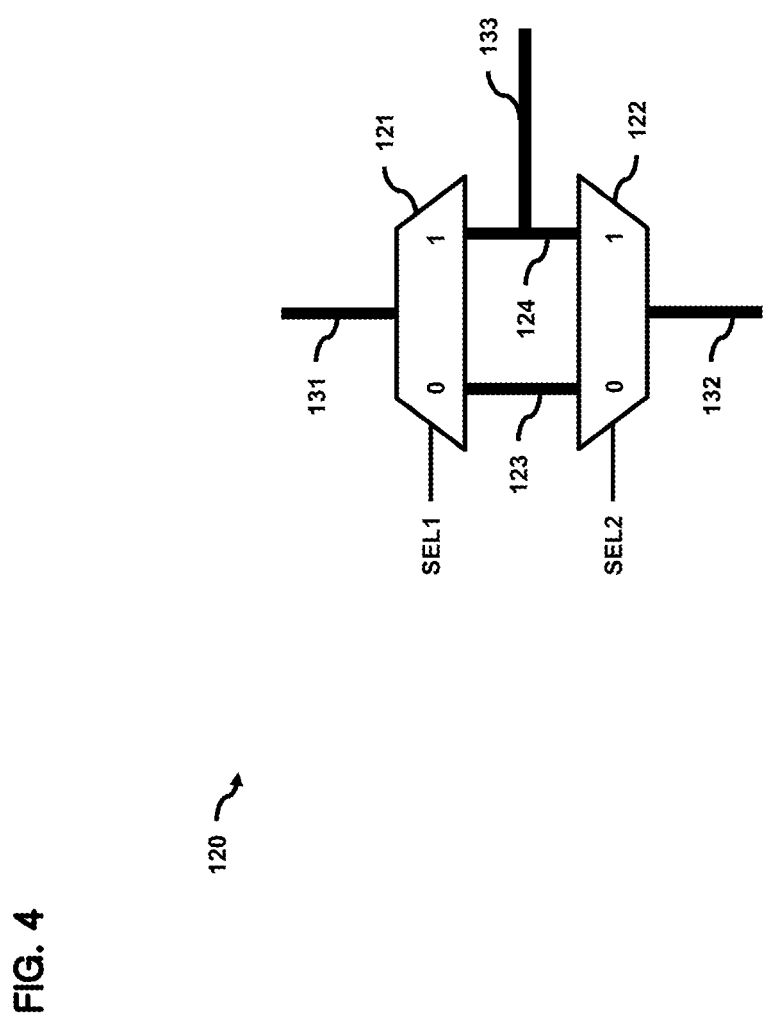
FIG. 4 is a block diagram illustrating a path setting unit of FIG. 2, according to an embodiment.

FIG. 4 is a block diagram illustrating the first path setting unit 120 of FIG. 2 according to an embodiment.

The path setting unit 120 includes a first selector 121, a second selector 122, a first internal bus 123, and a second internal bus 124.

The first selector 121 couples the first rank bus 131 to the first internal bus 123 or the second internal bus 124 according to a first select signal SEL1.

The second selector 122 couples the second rank bus 132 to the first internal bus 123 or the second internal bus 124 according to a second select signal SEL2.

The second internal bus 124 is coupled to the first intermediate buffer 110 through the third rank bus 133.

For example, when a general read or write command is executed, both of the first and second select signals SEL1 and SEL2 are set to a first logic value (e.g., a logic low value 0), such that the first and second rank buses 131 and 132 are coupled to each other via the first internal bus 123.

When a rank-level command is executed, the first select signal SEL1 is set to a second logic value (e.g., a logic high value 1), and the second select signal SEL2 is set to the logic low value 0. Thus, the first and third rank buses 131 and 133 are coupled to each other via the second internal bus 124, and the second rank bus 132 is isolated from the first and third rank buses 131 and 133.

When a channel-level command is executed, the first select signal SEL1 is set to the logic low value 0, and the second select signal SEL2 is set to the logic high value 1. Thus, the second and third rank buses 132 and 133 are coupled to each other via the second internal bus 124, and the first rank bus 131 is isolated from the second and third rank buses 132 and 133.

Referring back to FIG. 2, the first plurality of banks 101 to 108, the first intermediate buffer 110, and the first path setting unit 120, which are included in the first rank 100 are described from a logical point of view.

Physically, a plurality of memory devices (for example, a plurality of DRAM chips) may constitute one rank.

Hereinafter, a memory system according to an embodiment that includes a plurality of ranks will be described with reference to FIGS. 6-8. In such an embodiment, each of the plurality of ranks (e.g., first to fourth ranks 100 to 400 of FIG. 6) includes a plurality of memory devices (e.g., first to eighth memory devices 1100 to 1800 of FIG. 7). Each of the memory devices (e.g., the first memory device 1100) includes a plurality of banks (e.g., first to eighth banks 1101 to 1108 of FIG. 8), a path setting unit (a path setting unit 1120 of FIG. 8), and an intermediate buffer (e.g., an intermediate buffer 1110 of FIG. 8).

For example, the first banks (e.g., the first bank 1101 of FIG. 8) included in the respective memory devices (e.g., the first to eighth memory devices 1100 to 1800 of FIG. 7) collectively function as the first bank 101 in the first rank 100 of FIG. 2, the intermediate buffers (e.g., the intermediate buffer 1110 of FIG. 8) included in the respective memory devices (e.g., the first to eighth memory devices 1100 to 1800 of FIG. 7) collectively function as the first intermediate buffer 110 in the first rank 100 of FIG. 2, and path setting units (e.g., the path setting unit 1120 of FIG. 8) included in the respective memory devices (e.g., the first to eighth memory devices 1100 to 1800 of FIG. 7) collectively function as the first path setting unit 120 in the first rank 100 of FIG. 2.

For example, suppose that each of the memory devices has a data width of 64 bits and eight memory devices constitute one rank.

Assuming that each of the memory devices includes eight banks, a single intermediate buffer, and a single path setting unit, each of the banks processes data on a basis of eight bits, the intermediate buffer and the path setting unit process data on a basis of 64 bits. The rank including the eight memory devices processes data on a basis of 64 bytes.

Figure 6:
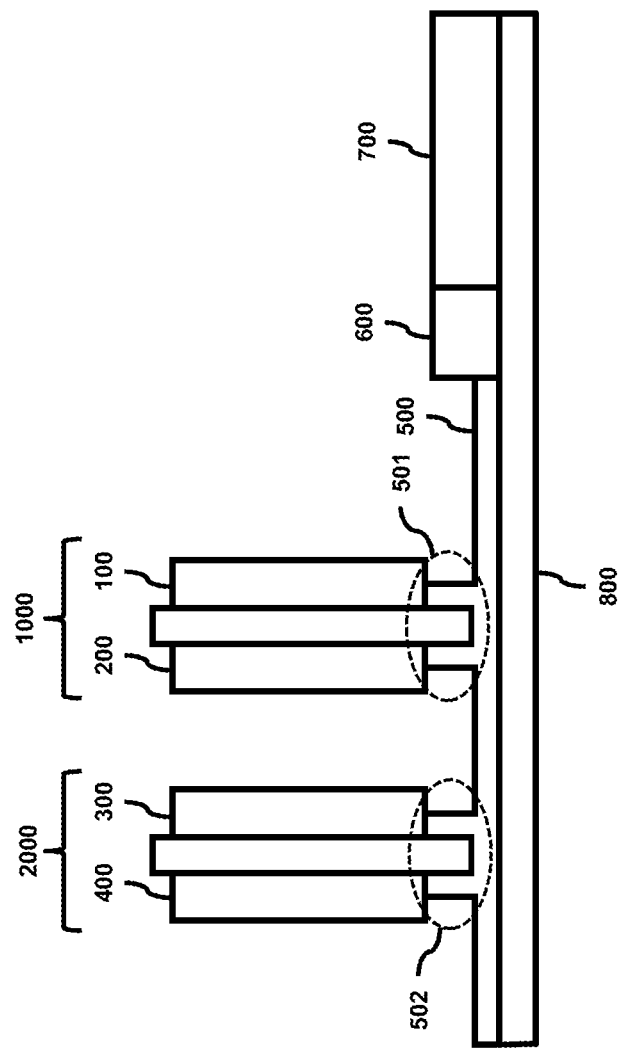
FIG. 6 is a diagram illustrating a memory system according to the embodiment.

FIG. 6 is a diagram illustrating a memory system 3 according to an embodiment.

The memory system 3 includes a central processing unit (CPU) 700 and a memory controller 600, which are attached to a printed circuit board (PCB) 800.

Although the memory controller 600 is separate from the CPU 700 in the embodiment shown in FIG. 6, embodiments of the present disclosure are not limited thereto. In an embodiment, the memory controller 600 may be included in the CPU 700.

The memory controller 600 is coupled to a rank shared bus (or a rank shared channel) 500 disposed on the PCB 800.

The rank shared bus 500 has first and second sockets 501 and 502 where first and second memory modules 1000 and 2000 are mounted, respectively. For example, each of the first and second memory modules 1000 and 2000 includes a Single In-line Memory Module (SIMM), a Dual In-line Memory Module (DIMM), or the like.

Memory devices mounted on a first surface of the first memory module 1000 constitute a first rank 100, and memory devices mounted on a second surface of the first memory module 1000 constitute a second rank 200.

Memory devices mounted on a first surface of the second memory module 2000 constitute a third rank 300, and memory devices mounted on a second surface of the second memory module 2000 constitute a fourth rank 400.

Figure 7:
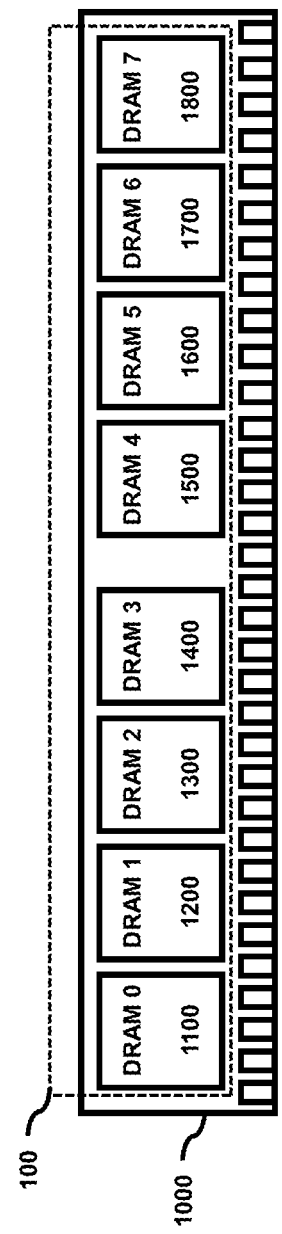
FIG. 7 is a plan view illustrating a surface of a memory module of FIG. 6, according to an embodiment.

FIG. 7 is a plan view illustrating the first surface of the first memory module 1000 of FIG. 6, according to an embodiment.

The first memory module 1000 includes eight memory devices 1100 to 1800 disposed on the first surface.

In the embodiment shown in FIG. 7, each of the memory devices 1100 to 1800 is a DRAM. However, embodiments of the present disclosure are not limited thereto, and different types of memory devices may be used as the memory devices 1100 to 1800.

The memory system 3 and the first and second memory modules 1000 and 2000, which are illustrated in FIGS. 6 and 7, may have substantially the same interface as a conventional memory system and memory modules of the conventional memory system, respectively.

In the embodiment shown in FIG. 7, each of the memory devices 1100 to 1800 includes an intermediate buffer and a path setting unit, which will be described with reference to FIG. 8.

Each of the memory devices 1100 to 1800 may further includes a command decoder that performs a decoding operation, in order to process a command which is additionally provided from the memory controller 600. However, the interface of the memory devices 1100 to 1800 with an external command/address bus and a data bus may not be changed.

Therefore, the exteriors of the memory system 3, the memory module, and the memory device according to the embodiment may be similar to those of the conventional memory system, the conventional memory module, and the conventional memory device, respectively.

This indicates that the memory devices 1100 to 1800 according to the embodiment shown in FIG. 7 can use the same interface as the conventional memory devices in the conventional memory system, resulting in beneficial aspects in terms of compatibility with the conventional memory devices.

Figure 8:
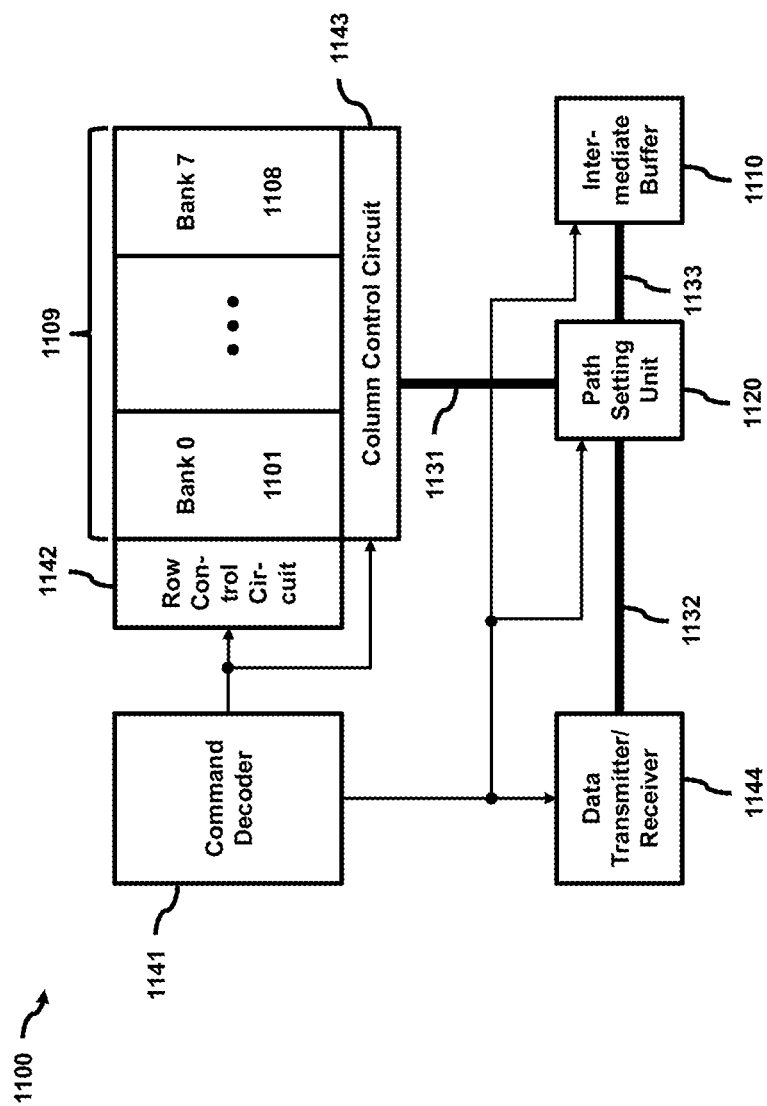
FIG. 8 is a block diagram illustrating a memory device of FIG. 7, according to an embodiment.

FIG. 8 is a block diagram illustrating the first memory device 1100 of FIG. 7 according to an embodiment.

The first memory device 1100 includes a cell region 1109, a row control circuit 1142 for controlling a row operation of the cell region 1109, and a column control circuit 1143 for controlling a column operation of the cell region 1109. The cell region 1109 includes a plurality of banks 1101 to 1108.

The first memory device 1100 further includes the command decoder 1141 that controls the row control circuit 1142 and the column control circuit 1143 using a received command and a received address.

The first memory device 1100 further includes a data transmitter/receiver (or a data transceiver) 1144 that inputs/outputs data according to control of the command decoder 1141.

The first memory device 1100 further includes an intermediate buffer 1110 and a path setting unit (or a path setting circuit) 1120.

The first memory device 1100 includes a first data bus 1131 coupled between the column control circuit 1143 and the path setting unit 1120, a second data bus 1132 coupled between the path setting unit 1120 and the data transmitter/receiver 1144, and a third data bus 1133 coupled between the path setting unit 1120 and the intermediate buffer 1110.

The command decoder 1141 may additionally process a rank-level command and a channel-level command which are provided from the memory controller 600 of FIG. 6.

The command decoder 1141 additionally controls the intermediate buffer 1110 and the path setting unit 1120.

For example, the command decoder 1141 may provide a first plurality of signals (e.g., the read/write signal R/W, the on/off signal ON/OFF and the entry signal ENTRY of FIG. 3) to control the intermediate buffer 1110, and may provide a second plurality of signals (e.g., the first and second select signals SEL1 and SEL2 of FIG. 4) to control the path setting unit 1120, by decoding a command and an address provided from the memory controller 600.

In an embodiment, a rank (e.g., the first rank 100 of FIG. 7) includes a plurality of memory devices (e.g., the first memory device 1100 of FIG. 8), which respectively includes a plurality of command decoders (e.g., the command decoder 1141), a plurality of path setting circuits (e.g., the path setting circuit 1120), a plurality of column control circuits (e.g., the column control circuit 1143), a plurality of intermediate buffers (e.g., the intermediate buffer 1110), and a plurality of data transceivers (e.g., the data transceiver 1144). In this embodiment, when the memory controller 600 provides a rank-level command to the rank, each of the plurality of command decoders causes a corresponding one of the plurality of path setting circuits and a corresponding one of the first plurality of intermediate buffers to transmit data between a corresponding one of the plurality of column control circuits and the corresponding one of the first plurality of intermediate buffers. When the memory controller provides a channel-level command to the rank, each of the plurality of command decoders causes the corresponding one of the plurality of path setting circuits and the corresponding one of the plurality of intermediate buffers to transmit data between a corresponding one of the plurality of data transceivers and the corresponding one of the plurality of intermediate buffers.

Each of the second to eighth memory devices 1200 to 1800 of FIG. 7 has substantially the same configuration as the first memory device 1100 of FIG. 8.

First banks (e.g., the first bank 1101 of FIG. 8) of the first to eighth memory devices 1100 to 1800 of FIG. 7 collectively function as the first bank 101 of FIG. 2, and the second banks of the first to eighth memory devices 1100 to 1800 of FIG. 7 also collectively function as the second bank 102 of FIG. 2, and so on.

Therefore, assuming that the first memory device 1100 of FIG. 8 inputs and outputs data on a basis of 64 bits, each of the first to eighth banks 1101 to 1108 in FIG. 8 may input and output 8-bit data, and each of the first to eighth banks 101 to 108 in FIG. 2 may input and output 8-byte data.

Intermediate buffers (e.g., the intermediate buffer 1110 of FIG. 8) of the first to eighth memory devices 1100 to 1800 of FIG. 7 collectively function as the intermediate buffer 110 of FIG. 2. Path setting units (e.g., the path setting unit 1120 of FIG. 8) of the first to eighth memory devices 1100 to 1800 of FIG. 7 collectively function as the path setting unit 120 of FIG. 2.

Therefore, assuming that each of the intermediate buffer 1110 and the path setting unit 1120 of FIG. 8 has a data width of 64 bits, the intermediate buffer 110 and the path setting unit 120 of FIG. 2 may respectively have a data width of 64 bytes.

First data buses (e.g., the first data bus 1131 of FIG. 8) of the first to eighth memory devices 1100 to 1800 of FIG. 7 collectively function as the first rank bus 131 of FIG. 2. Second data buses (e.g., the second data bus 1132 of FIG. 8) of the first to eighth memory devices 1100 to 1800 of FIG. 7 collectively function as the second rank bus 132 of FIG. 2. Third data buses (e.g., the third data bus 1133 of FIG. 8) of the first to eighth memory devices 1100 to 1800 of FIG. 7 collectively function as the third rank bus 133 of FIG. 2.

Therefore, assuming that each of the first to third data buses 1131 to 1133 of FIG. 8 has a data width of 64 bits, each of the first to third rank buses 131 to 132 of FIG. 2 may have a data width of 64 bytes.

In FIG. 2, components corresponding to data transmitter/receivers (e.g., the data transmitter/receiver 1144 of FIG. 8) of the first to eighth memory devices 1100 to 1800 of FIG. 7 are not shown. However, in an embodiment, the data transmitter/receiver (not shown) is disposed between the second rank bus 132 and the rank shared bust 500.

As described above, the intermediate buffer 110 and the path setting unit 120 of FIG. 2 are configured and operate in substantially the same manner as the intermediate buffer 1110 and the path setting unit 1120 of FIG. 8, respectively, except for a difference in data width between the intermediate buffer 110 and the intermediate buffer 1110 and a difference in data width between the path setting unit 120 and the path setting unit 1120. Thus, descriptions of the configuration and operations of the intermediate buffer 1110 and the path setting unit 1120 in FIG. 8 are omitted herein for the interest of brevity.

FIGS. 9 to 12 are graphs illustrating improvements in performance of a memory system according to an embodiment, compared to performance of a conventional memory system.

In each of the graphs, a horizontal axis indicates types of simulations, and a vertical axis indicates percentage values of performance improvement metrics over the conventional memory system.

Figure 9:
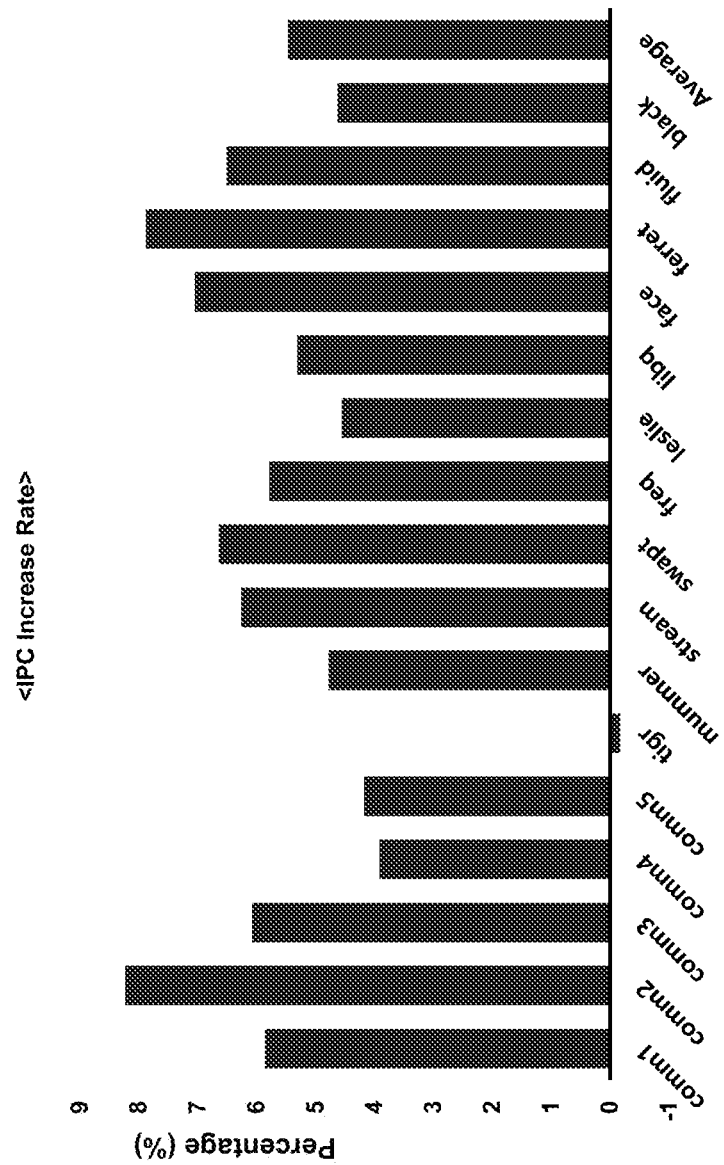
FIG. 9 illustrates percentage changes in a number of instructions processed per cycle (IPC) according to an embodiment.
Figure 10:
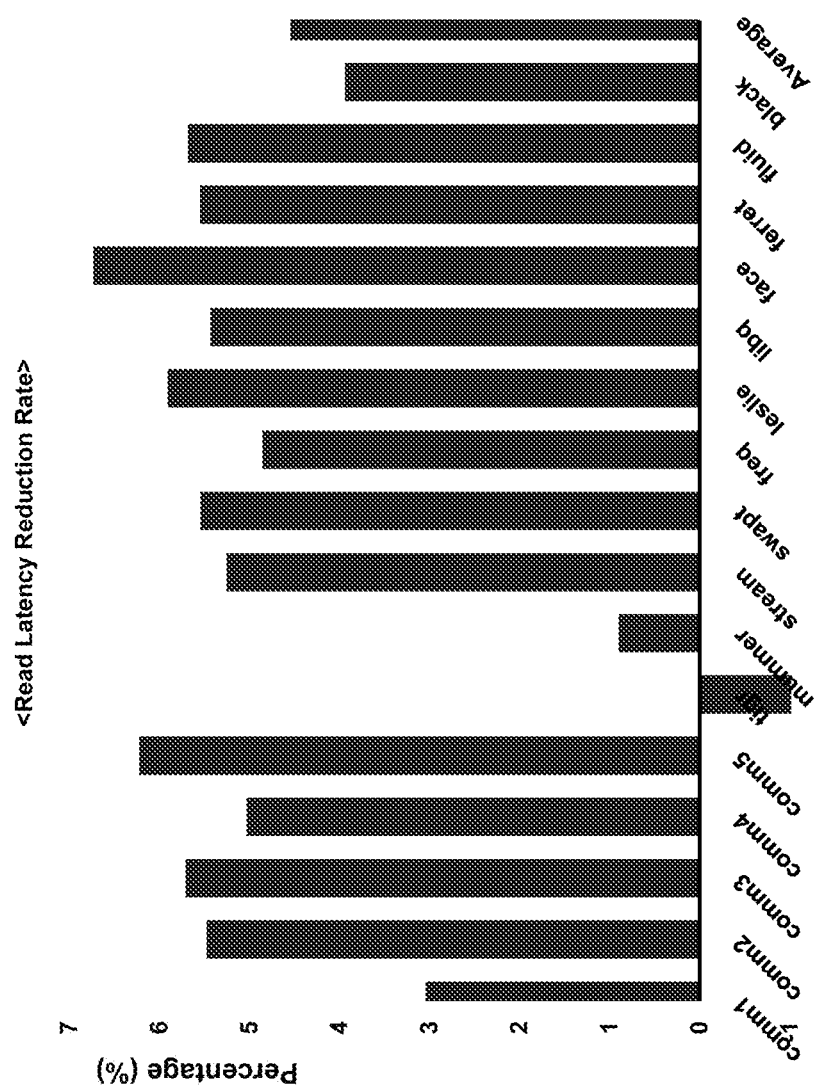
FIG. 10 illustrates percentage changes in reduction rates of read latency, according to an embodiment.

FIG. 9 illustrates percentage changes in a number of instructions processed per cycle (IPC), and FIG. 10 illustrates percentage changes in reduction rates of read latency.

As illustrated in FIGS. 9 and 10, the performance of the memory system according to an embodiment of the present disclosure was improved in all of the simulations excluding one simulation tigr, compared to the conventional memory system.

That is, in the remaining simulations for the memory system according to an embodiment, the number of IPC was increased and the read latency was reduced, compared to the conventional memory system.

Figure 11:
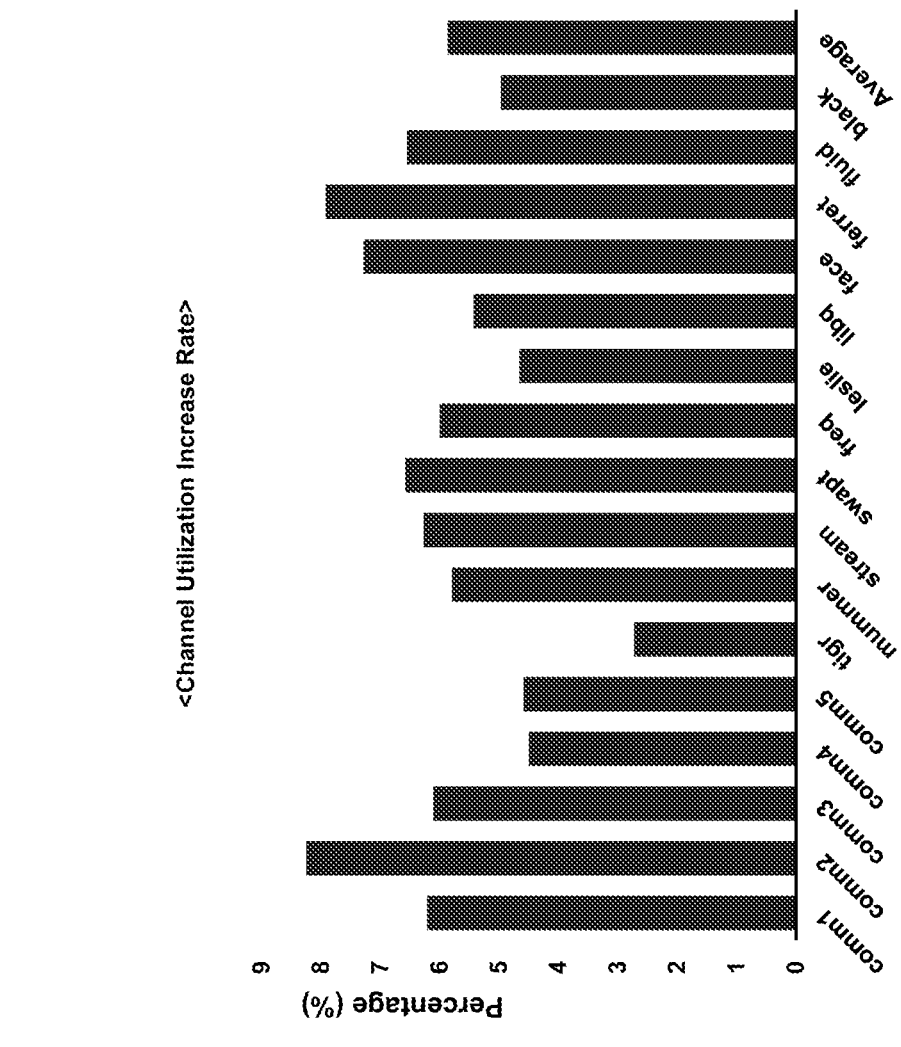
FIG. 11 illustrates percentage changes in channel utilization, according to an embodiment.

FIG. 11 illustrates percentage changes in channel utilization.

The channel utilization indicates a ratio of a time during which data are present in a channel of a memory system over an entire operation time of the memory system.

When the time during which data are present in the channel is increased, it may indicate that data are actively transmitted between a memory device and a memory controller included in the memory system, which indicates that the performance of the memory system is improved.

As illustrated in FIG. 11, the channel utilization of the memory system according to an embodiment was increased in all of the simulations.

Figure 12:
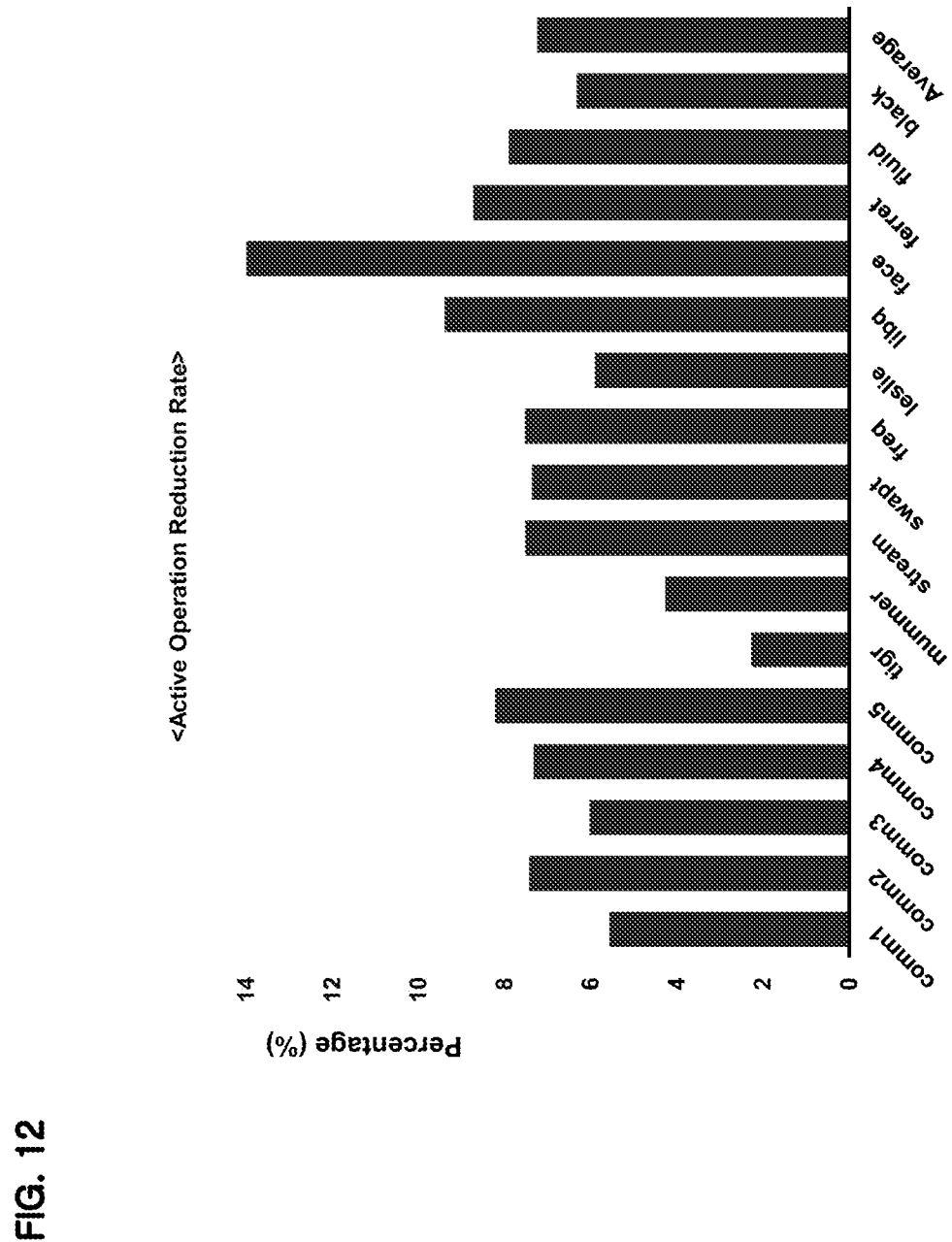
FIG. 12 illustrates percentage changes in active operation reduction rates according to an embodiment.

FIG. 12 shows that a number of active operations in the memory system according to an embodiment was decreased, compared to the conventional memory system.

When the number of active operations decreases while the same number of operations is processed, a waiting time required for performing each of the active operations can be reduced, which indicates that the performance is improved.

Furthermore, performing each of the active operations consumes a large amount of power to charge a word line. Thus, the decrease in the number of active operations may indicate that the power consumption is reduced.

As illustrated in FIG. 12, the number of active operations in the memory system according to an embodiment was decreased in all of the simulations, compared to the conventional memory system.

Thus, the memory system according to an embodiment of the present disclosure can reduce power consumption while the performance thereof is improved.

According to embodiments of the present disclosure, a memory system can exploit rank-level parallelism using intermediate buffers in ranks.

Such a memory system can improve the operation performance and energy efficiency thereof using the rank-level parallelism.

Although various embodiments have been described for illustrative purposes, it will be apparent to those skilled in the art that various changes and modifications may be made without departing from the spirit and scope of the invention as defined in the following claims.

What is claimed is:

1. A memory system comprising one or more of memory modules coupled to a memory controller through a channel, each of the one or more of memory modules comprising a plurality of ranks, each of the plurality of ranks comprising a plurality of memory devices, wherein each of the plurality of memory devices comprises:
   a cell region;
   a row control circuit configured to control a row operation of the cell region;
   a column control circuit configured to control a column operation of the cell region;
   a command decoder configured to process a command provided from the memory controller and to control the row control circuit and the column control circuit;
   a data transceiver configured to transmit/receive data to/from the channel according to control of the command decoder; and
   an intermediate buffer configured to communicate with the column control circuit or the data transceiver according to a first plurality of control signals from the command decoder,
   wherein the memory device further comprises a path setting circuit including a first selector and a second selector, the first selector configured to couple the column control circuit to the data transceiver or the intermediate buffer, the second selector configured to couple the data transceiver to the column control circuit or the intermediate buffer, so that the path setting circuit sets a first data transmission path between the column control circuit and the intermediate buffer, a second data transmission path between the data transceiver and the intermediate buffer, or a third data transmission path between the column control circuit and the data transceiver, according to a second plurality of control signals from the command decoder.

2. The memory system of claim 1, wherein the plurality of ranks includes a first rank, the first rank including a first plurality of memory devices, the first plurality of memory devices respectively including a first plurality of command decoders, a first plurality of path setting circuits, a first plurality of intermediate buffers, a first plurality of column control circuits, and a first plurality of data transceivers,
   wherein when the memory controller provides a rank-level command to the first rank, each of the first plurality of command decoders causes a corresponding one of the first plurality of path setting circuits and a corresponding one of the first plurality of intermediate buffers to transmit data between a corresponding one of the first plurality of column control circuits and the corresponding one of the first plurality of intermediate buffers, and
   when the memory controller provides a channel-level command to the first rank, each of the first plurality of command decoders causes the corresponding one of the first plurality of path setting circuits and the corresponding one of the first plurality of intermediate buffers to transmit data between a corresponding one of the first plurality of data transceivers and the corresponding one of the first plurality of intermediate buffers.

3. The memory system of claim 2, wherein the plurality of ranks further includes a second rank, the rank-level command is a first rank-level command, and the channel-level command is a first channel-level command, and
   wherein when the memory controller provides the first rank-level command to the first rank, the memory controller provides a second rank-level command or a second channel-level command to the second rank.

\* \* \* \* \*